United States Patent
Hepner

(10) Patent No.: US 7,752,602 B1
(45) Date of Patent: Jul. 6, 2010

(54) REVERSIBLE ATOMIC STEPS TO UNDO APPLICATION STARTUP

(75) Inventor: Daniel W. Hepner, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1681 days.

(21) Appl. No.: 10/953,255

(22) Filed: Sep. 28, 2004

(51) Int. Cl.
*G06F 9/44* (2006.01)

(52) U.S. Cl. ........................ 717/120; 717/128

(58) Field of Classification Search ............... 717/109, 717/174, 120, 127, 128; 719/221, 223, 321, 719/323; 718/1; 714/6, 45, 48, 100
See application file for complete search history.

(56) References Cited

U.S. PATENT DOCUMENTS

| | | | |
|---|---|---|---|
| 6,701,463 B1 * | 3/2004 | Toeller | 714/47 |
| 7,249,174 B2 * | 7/2007 | Srinivasa et al. | 709/223 |
| 7,293,255 B2 * | 11/2007 | Kumar | 717/109 |
| 2002/0174420 A1 * | 11/2002 | Kumar | 717/174 |
| 2003/0233385 A1 * | 12/2003 | Srinivasa et al. | 718/1 |
| 2003/0233431 A1 * | 12/2003 | Reddy et al. | 709/221 |
| 2004/0162807 A1 * | 8/2004 | Montagne | 707/1 |

* cited by examiner

*Primary Examiner*—Van H Nguyen

(57) ABSTRACT

An application package startup procedure is divided into a plurality of atomic steps. For each of the plurality of atomic steps, a start fragment is created. The start fragment is configured to execute substeps that further the startup procedure. A stop fragment is created. The stop fragment is configured to execute substeps that undo its corresponding start fragment.

16 Claims, 5 Drawing Sheets

REVERSIBLE ATOMIC STEPS TO UNDO APPLICATION STARTUP

BACKGROUND OF THE INVENTION

In a computer cluster environment, it may be desirable to start an application package on one computer and, if the start encounters an error, then attempt to start the application package on a second computer in the cluster. Attempting to start the application package on a second computer may result in success where the first attempt failed. However, if the start fails on the first computer, traces of the start attempt need to be removed from the first computer before attempting a start on the second computer. Otherwise, the traces of the start attempt left on the first computer may be in contention with a completed start on the second computer. This is an undesirable condition.

FIG. 1 depicts an example of a prior art computer cluster environment in which an application package startup procedure (startup) may be attempted on one computer and, if the startup procedure fails, the application package may be moved to another computer. Cluster environment 100 includes computer 1 104 and computer 2 106. Two computers are shown for exemplary purposes only. The cluster could have more computers, for example, sixteen computers. The computer 104 and the computer 106 are interconnected via switches 108 and 110. Therefore, the computers 104 and 106 see the same resources. In this example, the switches 108 and 110 allow the computers 104 and 106 to see shared storage 112 and 114. Application clients 102 are connected to the computers 104 and 106 by a Local Area Network (LAN).

In an exemplary scenario, a customer would like to start an application package. The application package could be, for example, an ORACLE® database with processing software. The customer would like to start the package on the computer 104, and if it does not start, they would like to be able to stop the package on the computer 104 and attempt to start the package on the computer 106. To accomplish this, traces of the startup attempt on the computer 104 need to be removed. Otherwise, the traces of the startup attempt left on the computer 104 may be in contention with a successful startup on the computer 106.

FIGS. 2 and 3 depict an exemplary prior art process for undoing a failed startup attempt. FIG. 2 depicts an exemplary startup procedure 200 including, for example, over two hundred steps. In the example, the startup procedure 200 is implemented as a script. The script may, for example, call various functions at various points in time, such as functions 202, 204, 206, and 208. Parts of the script may be recursive, for example. In the example, the script exists as one large unbroken startup procedure 200. To facilitate discussion, an error is encountered, for example at step 210, as shown in FIG. 2. In response to the error, the startup procedure 200 stops, and an error number, in this case error #37 for example, is generated.

In FIG. 3, the error #37 is fed into a stop script 300 to attempt to undo the startup procedure 200. Because the start script 200 is a large, continuous series of steps, some of which may call on external functions and others of which may be recursive, stop script 300 needs to take these complicated occurrences into account in resolving the error, e.g., resolving error #37. Accordingly, the creation of a stop script 300 that can handle all errors generated when the start script is executed in the prior art manner is a difficult and complex task. Yet, such a stop script is required in the prior art if a failed start attempt is to be properly handled.

SUMMARY OF INVENTION

The invention relates to a method for managing an application package startup procedure (startup procedure or startup) having reversible steps. In one embodiment, the method includes dividing the application package startup procedure into a plurality of atomic steps. For each of said plurality of atomic steps, the method includes creating a start fragment, the start fragment configured to execute substeps that further the startup procedure, and creating a stop fragment, the stop fragment configured to execute substeps that undo its corresponding start fragment.

In another embodiment of the invention, the method includes executing start fragments associated with the plurality of atomic steps in a step-wise manner until one of the start fragments encounters an error. The method also includes, if one of the start fragments encounters an error, executing the stop fragment corresponding to the start fragment that encountered the error, and, executing previous stop fragments in a step-wise manner.

In another embodiment of the invention, the method includes start or stop fragments which are optionally null. This results in an atomic step which has an effect while starting, or stopping, but not both.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with embodiments of the present invention, there are provided methods and arrangements for reversible atomic steps to undo an application package startup procedure. The reversible atomic steps allow the startup procedure to be undone in a controlled, step-wise manner. Further, since each atomic step may be substantially self-contained, it is substantially simpler to create a procedure for undoing the start fragment of an atomic step than to create a stop script for the entire startup procedure.

In an embodiment, each atomic step comprises a start fragment and a stop fragment. Each start fragment includes substeps that handle a portion of the overall startup procedure. That is, each start fragment is configured to execute substeps that further the startup procedure. Furthermore, each stop fragment undoes its corresponding start fragment. That is, each stop fragment is configured to execute substeps that undo its corresponding start fragment.

Figure 1:
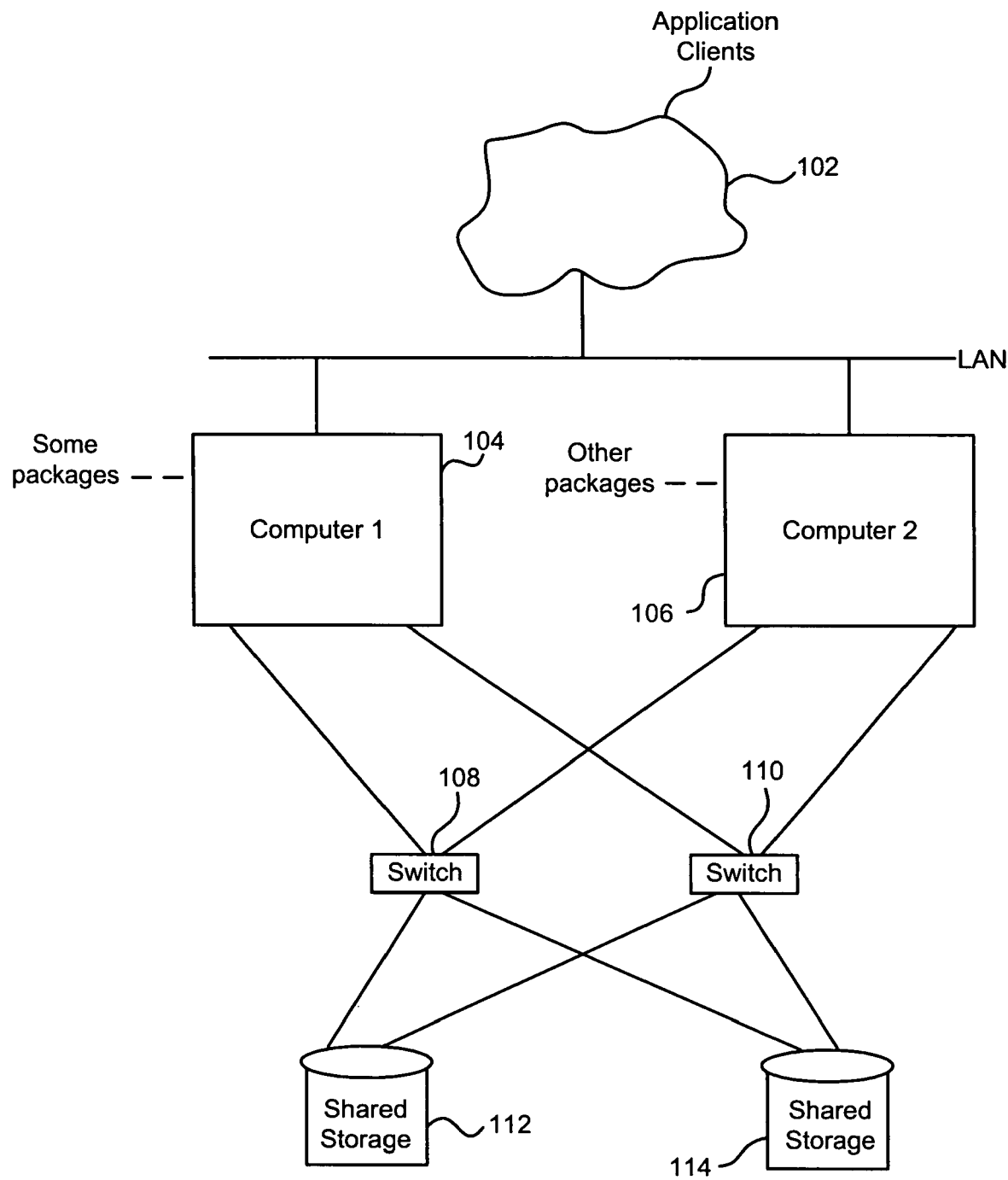
FIG. 1 depicts an example of a prior art computer cluster environment in which an application package startup procedure may be attempted on one computer and, if the startup fails, the application package may be moved to another computer.
Figure 2:
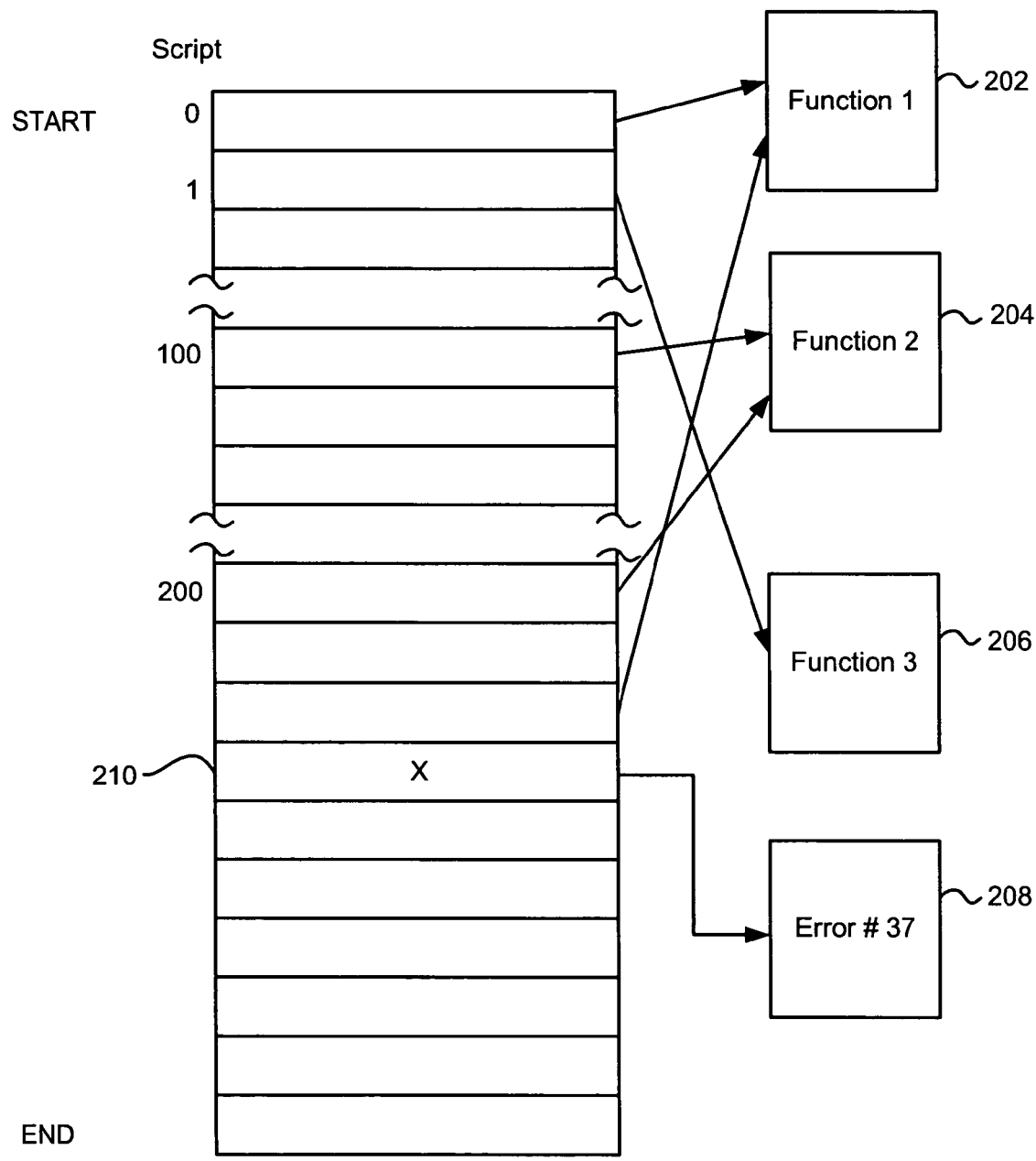
FIGS. 2 and 3 depict an exemplary prior art process for undoing a failed startup attempt.
Figure 3:
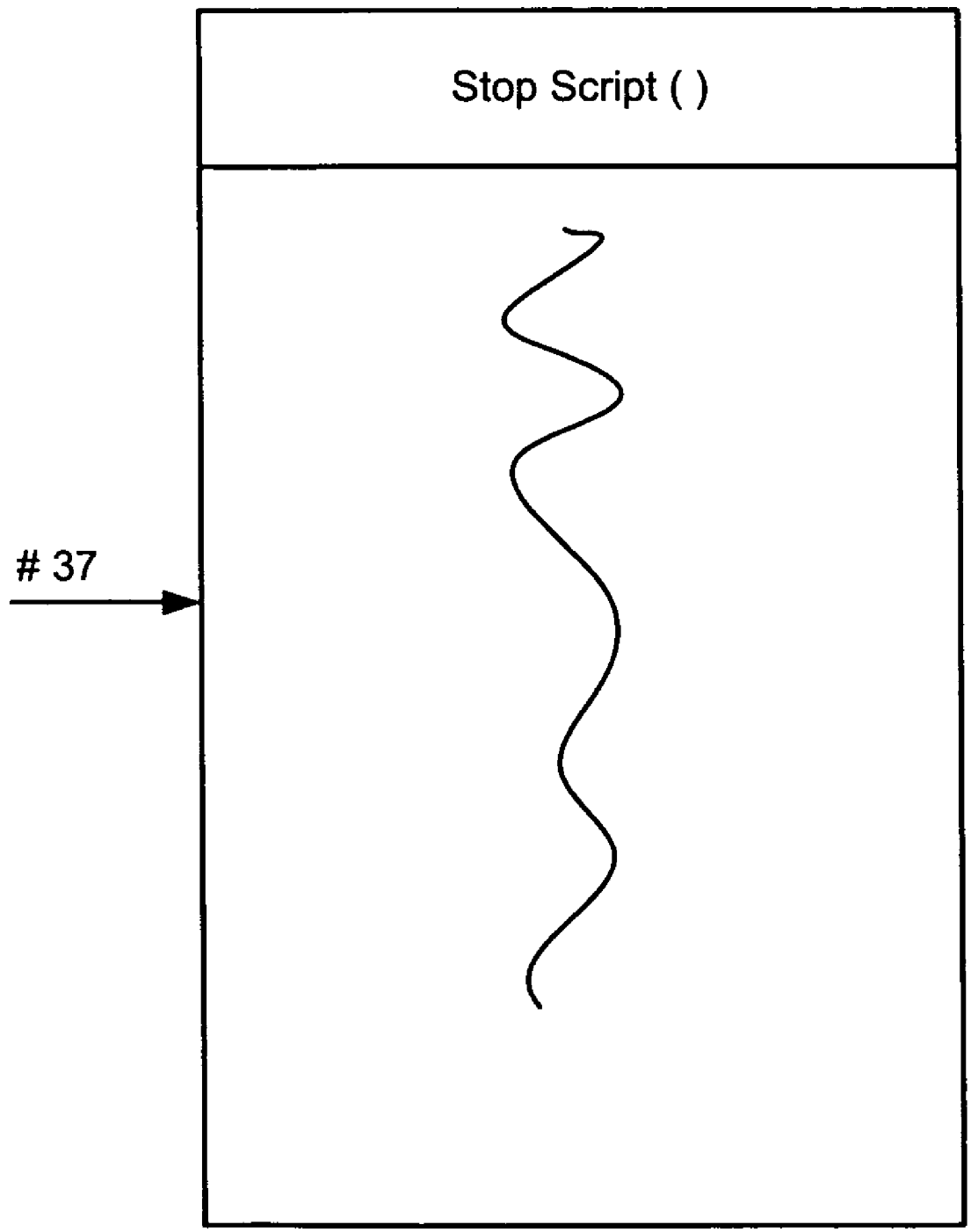
Figure 4:
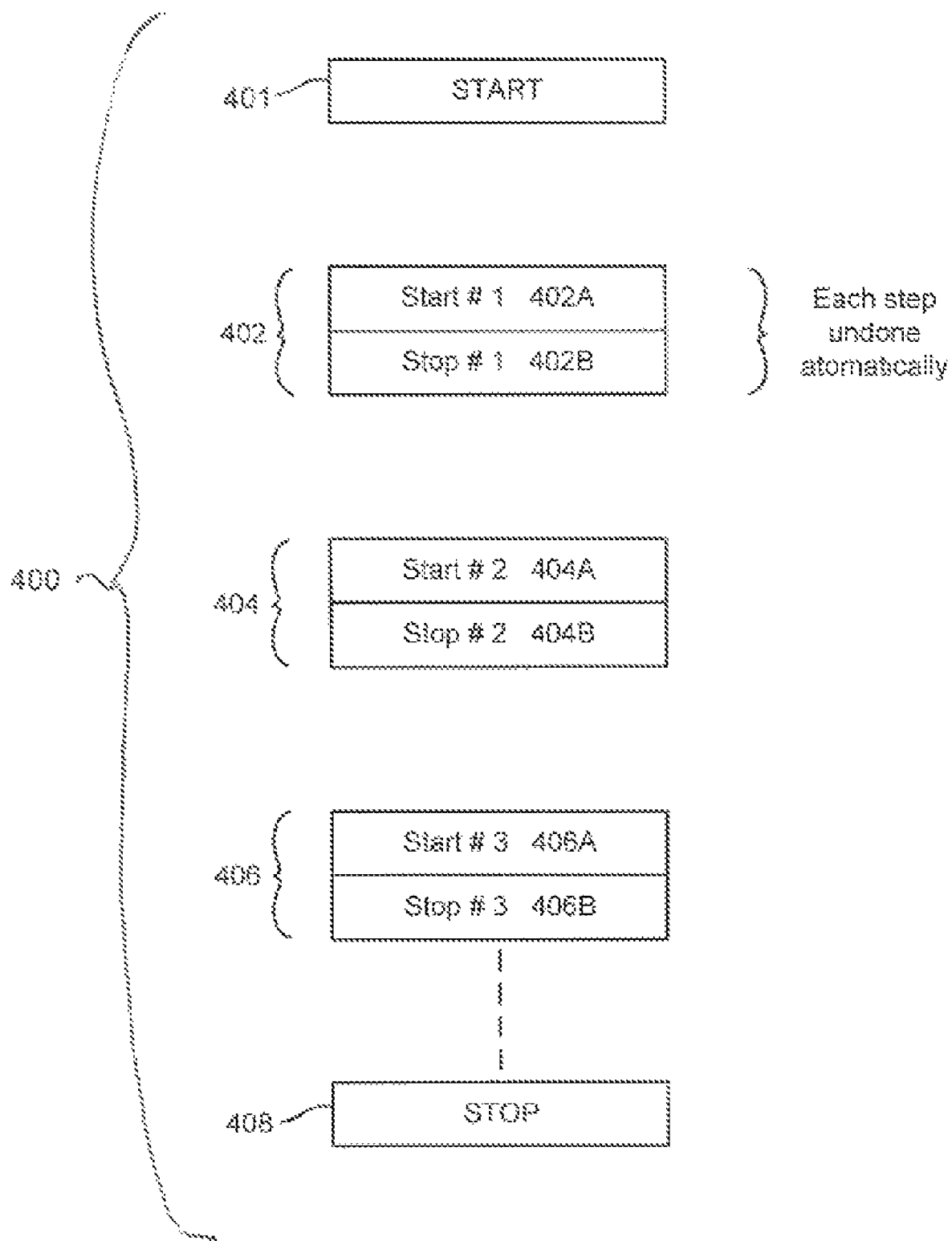
FIG. 4 depicts an exemplary startup procedure divided into atomic steps, according to an embodiment of the present invention.

FIG. 4 depicts an exemplary code implementing an application package startup procedure (startup procedure or startup) 400 divided into atomic steps, according to an embodiment of the present invention. In contrast with the conventional approach described with reference to FIGS. 2 and 3, the startup procedure 400 is divided into steps which may be undone (reversed) atomically (discretely).

Referring again to FIG. 4, the startup procedure 400 includes a start mechanism 401, atomic steps 402, 404, and 406, and a stop mechanism 408. Each of the atomic steps 402, 404, and 406 includes a start fragment and a stop fragment, which may be particular to their corresponding atomic step. For example, the atomic step 402 includes a start fragment #1 402A and a stop fragment #1 402B. Similarly, the atomic step 404 includes a start fragment #2 404A and a stop fragment #2 404B. Furthermore, the atomic step 406 includes a start fragment #3 406A and a stop fragment #3 406B. In the event of a failed startup attempt (startup failure), each of the atomic steps 402, 404, and 406 are undone atomically in a step-wise manner. Three atomic steps are shown as an example only. Any number of atomic steps is possible.

In one embodiment, the steps are as large as possible while still being atomic. That is, the steps may be kept as large as possible, while maintaining the ability to easily analyze the task of undoing the steps atomically. To undo the steps atomically means to undo each of the steps discretely, i.e. in a manner such that an individual step does not affect other steps nor is the individual step affected by the other steps. In other words, each step is substantially self-contained. However, it is preferable to keep the atomic step size to a size that renders the task of writing a stop fragment manageable, because if the step is too large, the same difficulty associated with the prior art stop procedure is encountered again.

Because the startup procedure 400 is segmented into atomic steps, the creator of each atomic step would be familiar with his/her own atomic step and can readily create a stop fragment to undo the corresponding start fragment. In contrast, a complex undo procedure covering the entire startup procedure must be created in the prior art. In the context of a complex startup procedure wherein multiple teams of programmers may work on the same startup procedure, the feature of segmenting the startup procedure into atomic steps and providing both a start fragment and a stop fragment for each atomic step substantially simplifies the process of creating a startup procedure (and its corresponding undo procedure) for a package. From the user's perspective, the undoing is performed automatically in a reverse step-wise fashion.

Figure 5:
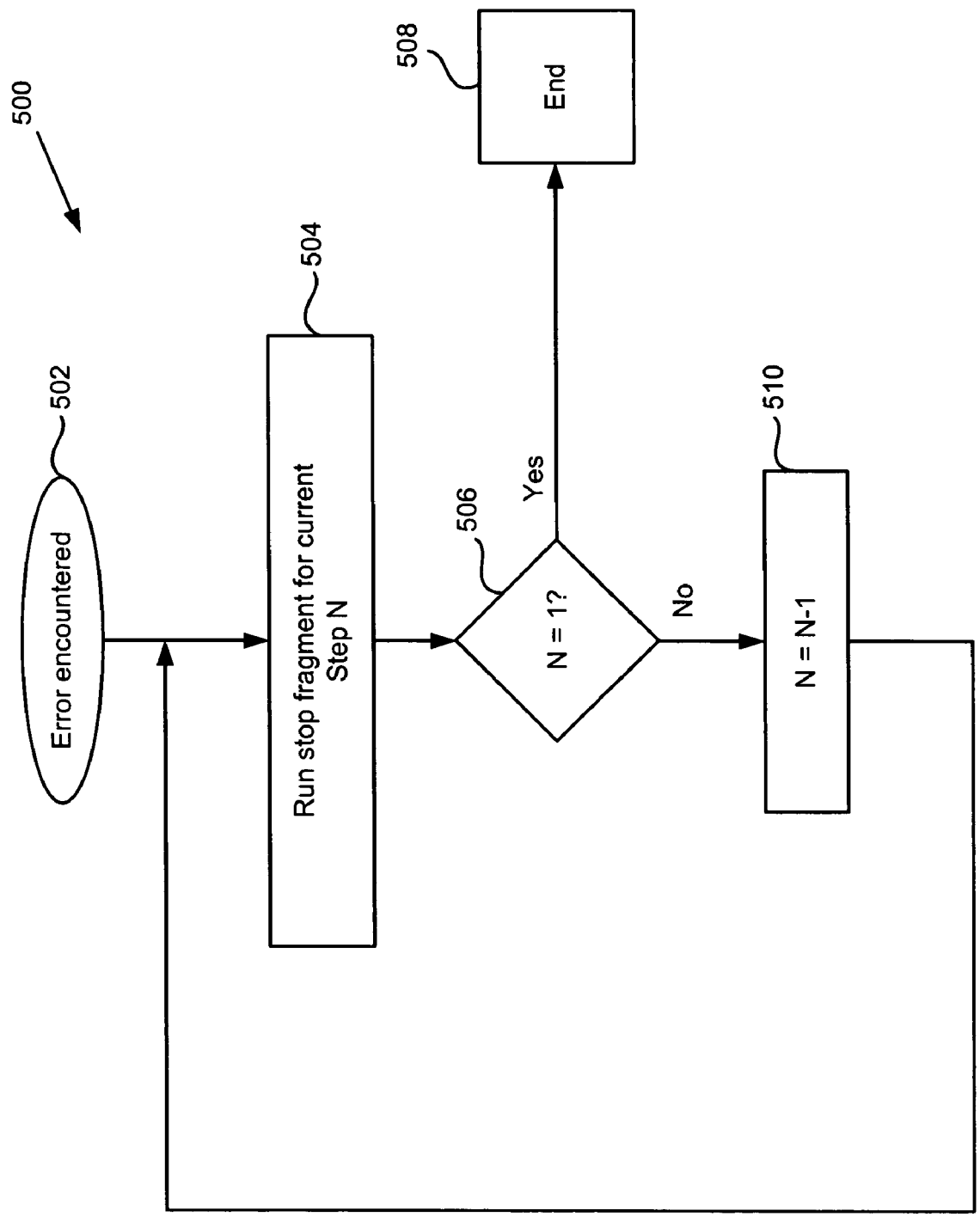
FIG. 5 is a flowchart depicting a startup undo procedure, according to an embodiment of the present invention.

FIG. 5 is a flowchart depicting a startup undo procedure 500, according to an embodiment of the present invention. At block 502, an error is encountered. At block 504, the stop fragment for current step N is run. At block 506, a determination is made as to whether N=1 (assuming, in this example, that N=1 represents the first atomic step of the startup procedure). If N=1, then at block 508, the startup undo procedure 500 ends. If N≠1, then at block 510, N is assigned the value N−1 and the startup undo procedure returns to block 504.

Thus, for example, if an error is encountered at atomic step 3 406, at block 504, the stop fragment #3 406B is run (because the current step is N=3). Since N≠1, at block 506, N is decremented to N=2, and the stop fragment #2 404B is run. After the stop fragment #2 404B is run, since N≠1, at block 506, N is decremented to N=1, and the stop fragment #1 402B is run. Once the stop fragment corresponding to N=1 has been run, then the startup undo procedure 500 ends at block 508. Upon completion of the startup undo procedure 500, substantially all traces of the failed start are removed. Thus, it is safe to attempt to startup the application package on another computer in the cluster (computer cluster environment).

As mentioned, some of the atomic steps may, in an embodiment, include start or stop fragments which are null. This results in an atomic step which has an effect while starting, or stopping, but not both. Thus, in an embodiment, every atomic step that has a start fragment that furthers the startup procedure also has a corresponding stop fragment that undoes the startup fragment. In another embodiment, however, it is not absolutely required that every atomic step that has a start fragment that furthers the startup procedure must have a corresponding stop fragment that undoes the startup fragment. Likewise, it is not absolutely required that every atomic step that has a stop fragment that partially reverses the startup procedure must have a corresponding start fragment that furthers the startup procedure.

It should be noted that the invention not only encompasses the techniques for reversible atomic steps to undo an application package startup but also compasses the physical devices or arrangements that implement the disclosed techniques. Such a device includes, for example, a computer system, a computer network, or any electronic device that manages feedback data. The invention also covers an article of manufacture (such as disk drives, computer memory chips, etc.) having thereon the data storage medium that stores the computer-readable code that implements the disclosed techniques.

While this invention has been described in terms of several embodiments, there are alterations, permutations, and equivalents which fall within the scope of this invention. For example, although the example herein discusses reversible atomic steps to undo an application package startup to make the application package more movable within a cluster environment, the invention may be employed to reversible atomic steps to undo an application package startup in a non-cluster environment. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for creating application package startup code configured to startup an application package, comprising:

dividing steps associated with a procedure for starting said application package into atomic steps;

for each of a first plurality of said atomic steps, creating a start fragment, said start fragment being configured to execute substeps that further said startup of said application package;

creating a stop fragment, said stop fragment being configured to execute substeps that undo its corresponding start fragment;

executing, on a computer, said start fragment; and creating code for executing, on said computer, a number of stop fragments associated with said atomic steps to cause all traces of said application package startup code being attempted to be removed if a start fragment associated with said atomic steps encounters an error.

2. The method of claim 1, wherein one of a start fragment and a stop fragment of a given atomic step of said atomic steps is null, and another of said start fragment and said stop fragment of said given atomic step respectively furthers said startup of said application package or partially reverses said startup of said application package.

3. The method of claim 1, wherein each of a second plurality of said atomic steps is configured to be as large as possible while still being atomic.

4. The method of claim 1, wherein each of a second plurality of said atomic steps is substantially self-contained.

5. A method for starting an application package utilizing application package startup code, comprising:

executing, on a computer, start fragments associated with a plurality of atomic steps in a step-wise manner until one of said start fragments encounters an error, wherein said application package startup code is divided into said plurality of atomic steps, each of said plurality of atomic steps including a start fragment and a stop fragment configured to undo its corresponding start fragment; and if said one of said start fragments encounters said error, a) executing, on said computer, a stop fragment corresponding to said one of said start fragments that encountered said error, b) executing, on said computer, previous stop fragments in a step-wise manner; and (c) removing, after said stop fragment corresponding to said one of said start fragments that encountered said error and said previous stop fragments have been executed, all traces of said application package startup code being attempted.

6. The method of claim 5, wherein said application package startup code is executed in a computer cluster environment.

7. The method of claim 6, wherein each of said plurality of atomic steps is configured to be as large as possible while still being atomic.

8. The method of claim 7, further comprising:

executing, after substantially all traces of said application package startup code being attempted have been removed, said start fragments in a step-wise manner on another computer in said computer cluster environment.

9. The method of claim 5, wherein each of said plurality of atomic steps is substantially self-contained.

10. The method of claim 5, wherein one of a start fragment and a stop fragment of a given atomic step of said plurality of atomic steps is null.

11. An article of manufacture comprising a program storage medium having computer readable code stored thereon, comprising:

computer readable code for executing start fragments associated with a plurality of atomic steps in a step-wise manner until one of said start fragments encounters an error, wherein said computer readable code being configured to start an application package utilizing application package startup code, said application package startup code is divided into said plurality of atomic steps, each of said plurality of atomic steps including a start fragment and a stop fragment configured to undo its corresponding start fragment;

computer readable code for executing, if said one of said start fragments encounters said error, a stop fragment corresponding to said one of said start fragments that encountered said error;

computer readable code for executing thereafter, if said one of said start fragments encounters said error, previous stop fragments in a step-wise manner; and computer readable code for removing, after said stop fragment corresponding to said one of said start fragments that encountered said error and said previous stop fragments have been executed, all traces of said application package startup code being attempted.

12. The article of manufacture of claim 11, further comprising computer readable code stored thereon for:

executing, after substantially all traces of said application package startup code being attempted have been removed, said start fragments associated with said plurality of atomic steps in a step-wise manner on another computer in a computer cluster environment.

13. The article of manufacture of claim 11, wherein each of said plurality of atomic steps is configured to be as large as possible while still being atomic.

14. The article of manufacture of claim 11, wherein each of said plurality of atomic steps is substantially self-contained.

15. The article of manufacture of claim 11, wherein said application package startup code is executed in a computer cluster environment.

16. The method of claim 11, wherein one of a start fragment and a stop fragment of a given atomic step of said plurality of atomic steps is null.

* * * * *